(12) United States Patent
Blue et al.

(10) Patent No.: US 11,155,744 B2
(45) Date of Patent: Oct. 26, 2021

(54) COATED LOST CIRCULATION MATERIALS AND METHODS OF USING SAME

(71) Applicant: M-I L.L.C., Houston, TX (US)

(72) Inventors: Aaron Blue, Houston, TX (US); Joshua Sheldon, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/326,678

(22) PCT Filed: Aug. 18, 2017

(86) PCT No.: PCT/US2017/047577
§ 371 (c)(1),
(2) Date: Feb. 19, 2019

(87) PCT Pub. No.: WO2018/035445
PCT Pub. Date: Feb. 22, 2018

(65) Prior Publication Data
US 2019/0225866 A1 Jul. 25, 2019

Related U.S. Application Data

(60) Provisional application No. 62/377,222, filed on Aug. 19, 2016.

(51) Int. Cl.
*E21B 33/138* (2006.01)
*E21B 21/00* (2006.01)
*C09K 8/508* (2006.01)
*C09K 8/42* (2006.01)
*C09K 8/516* (2006.01)
(Continued)

(52) U.S. Cl.
CPC ............ *C09K 8/5086* (2013.01); *C09K 8/426* (2013.01); *C09K 8/502* (2013.01); *C09K 8/516* (2013.01); *E21B 21/003* (2013.01); *E21B 33/138* (2013.01); *E21B 43/26* (2013.01); *C09K 2208/04* (2013.01)

(58) Field of Classification Search
CPC ..... E21B 21/003; E21B 33/138; C09K 8/516; C09K 8/502; C09K 8/426; C09K 8/5086
See application file for complete search history.

(56) References Cited

U.S. PATENT DOCUMENTS 3,496,902 A * 2/1970 Kern ..................... E21B 21/003
175/72
3,929,191 A 12/1975 Graham et al.
(Continued)

OTHER PUBLICATIONS

International Search Report and Written Opinion for the equivalent International patent application PCT/US2017/047577 dated Nov. 15, 2017.

*Primary Examiner* — Silvana C Runyan

(57) ABSTRACT

A method of reducing fluid loss includes pumping a wellbore fluid including resin coated solid particulate into a wellbore having fractures therein, the resin coated solid particulate forming a substantially impermeable plug in the fractures. A method of drilling a wellbore includes drilling a wellbore through a formation using a first wellbore fluid; and upon experiencing a fluid loss event to the formation, pumping a second wellbore fluid including resin coated solid particulates into the wellbore.

16 Claims, 3 Drawing Sheets

(51) Int. Cl.
 *C09K 8/502* (2006.01)
 *E21B 43/26* (2006.01)

(56) References Cited

U.S. PATENT DOCUMENTS

| | | | |
|---|---|---|---|
| 4,629,575 A * | 12/1986 | Weibel | C09K 8/206 |
| | | | 106/162.9 |
| 5,422,183 A * | 6/1995 | Sinclair | C09K 8/62 |
| | | | 166/280.2 |
| 5,799,734 A | 9/1998 | Norman et al. | |
| 7,004,255 B2 | 2/2006 | Boney | |
| 8,273,406 B1 | 9/2012 | Ferrell, Jr. et al. | |
| 9,103,206 B2 | 8/2015 | Alberty et al. | |
| 2003/0201103 A1 | 10/2003 | Brookey et al. | |
| 2008/0108520 A1 | 5/2008 | Fu et al. | |
| 2014/0182369 A1 | 7/2014 | Blue et al. | |
| 2016/0137903 A1 | 5/2016 | Friedheim et al. | |

\* cited by examiner

COATED LOST CIRCULATION MATERIALS AND METHODS OF USING SAME

CROSS-REFERENCE TO RELATED APPLICATION

The present application claims priority to U.S. Application Ser. No. 62/377,222, filed Aug. 19, 2016, which is incorporated herein by reference in its entirety.

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, a wellbore fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure, to prevent the ingress of formation fluids into the wellbore, to cool and lubricate the drill string and bit, and/or to maximize penetration rate.

For a wellbore fluid to perform these functions and allow drilling or other wellbore operations to continue, the wellbore fluid has to stay in the borehole. Frequently, undesirable formation conditions are encountered in which substantial amounts or, in some cases, all of the wellbore fluid may be lost to the formation. Wellbore fluid can leave the borehole through large or small fissures or fractures in the formation or through a highly porous rock matrix surrounding the borehole. Thus, fluid loss or lost circulation is a recurring problem in wellbore operations, characterized by loss of wellbore fluids into downhole formations. Further, fluids besides "drilling fluids" can potentially be lost, including completion, drill-in, production fluid, etc. Lost circulation can occur naturally in formations that are fractured, highly permeable, porous, cavernous, or vugular. These earth formations can include shale, sands, gravel, shell beds, reef deposits, limestone, dolomite, and chalk, among others.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of reducing fluid loss that includes pumping a wellbore fluid including resin coated solid particulate into a wellbore having fractures therein, the resin coated solid particulate forming a substantially impermeable plug in the fractures.

In another aspect, embodiments disclosed herein relate to a method of drilling a wellbore that includes drilling a wellbore through a formation using a first wellbore fluid; and upon experiencing a fluid loss event to the formation, pumping a second wellbore fluid including resin coated solid particulates into the wellbore.

Other aspects and advantages of the claimed subject matter will be apparent from the following description and the appended claims.

DETAILED DESCRIPTION

Figure 1:
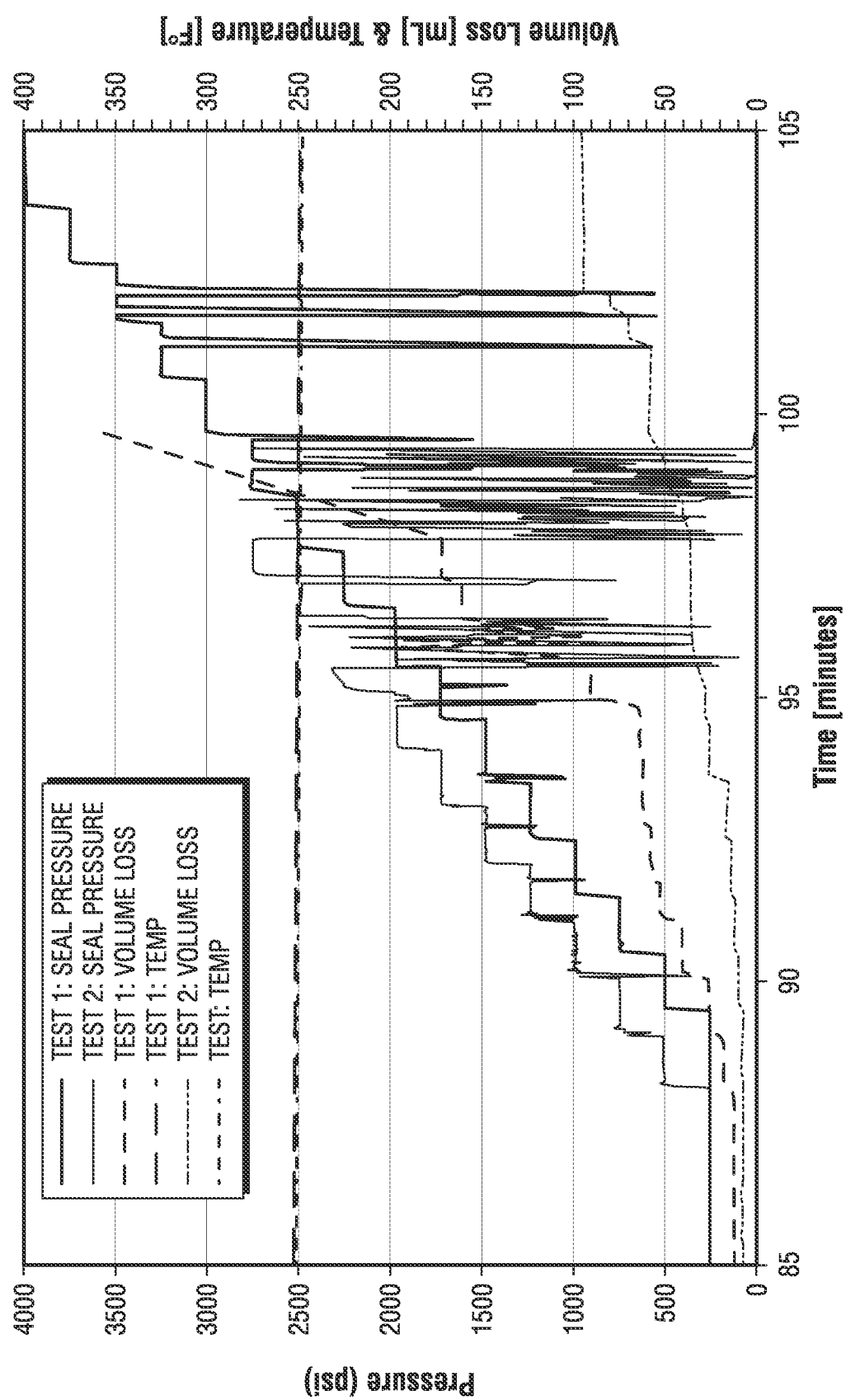
FIG. 1 shows a plot of the results obtained from a slot test described in Example 1.

Embodiments disclosed herein relate generally to compositions that include coated lost circulation materials and methods of using compositions including coated lost circulation materials. More specifically, embodiments disclosed herein relate to a resin coated lost circulation material that may freely flow while diluted within a wellbore fluid but once entrained and concentrated within a loss zone, such as a fracture or other permeable opening in the formation, may react or fuse to form an impermeable plug and effectively seal a loss zone.

The lost circulation compositions of the present disclosure include lost circulation material (LCM) that is a solid particulate material that has a resin coating thereon. The solid particulate material is not particularly limited and can be a plant-based material, an inorganic material, a carbon based material, or mixtures thereof. For example, in one or more embodiments, the solid particulate material may be selected from naturally occurring materials as well as materials based on naturally occurring materials that have been processed and/or derivatized. Suitable examples of naturally occurring particulate materials for use as lost circulation materials include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed material of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc. In one or more embodiments, the solid particulate material may be particulates of calcium carbonate, graphite, silica/quartz, ceramics, sand, barite, other naturally occurring minerals, synthetic fibers, and naturally occurring fibers. A carbon-based material may include graphite, carbon black, carbon nanotubes, amorphous carbon, or graphene.

It should be understood that the selection of the $D_{50}$ for the particles should be made with the size of the estimated loss zone in mind as too small of particles may flow through the loss zone without bridging or plugging, while too large of particles will not be able to enter the opening or mouth of the loss zone. However, in one or more embodiments, the solid particulate material (whether or not it is coated) has a $d_{50}$ ranging from of about 10 to 5000 microns. Additionally, the particle size distribution (PSD) of the solid particulate material may be broad, as a wide range of particle sizes within a composition may facilitate the formation of a more dense pack or plug of material to effectively seal off a loss zone such as a fracture. For example, in one or more embodiments, the largest particle of the solid particulates may be no less than about two times larger (in the largest dimension) than the smallest particle.

In one or more embodiments, only a portion of the solid particulates of the LCM composition are coated with a resin material. For example, at least about 25 wt. %, about 35 wt. %, about 40 wt. %, or at least about 50 wt. % of the solid particulates in the LCM composition may be coated with the resin material. In one or more embodiments, all of the solid particulates in the LCM composition may be coated with the resin material. In one or more embodiments, particles used in the LCM composition that are larger than the $d_{50}$, $d_{60}$, $d_{65}$, or $d_{75}$ of the total particulates may be coated with a resin material, with the other solid particulates remaining uncoated. The particular $d_x$ value that represents the minimum size for the particles that are coated depends, for example, on the overall particle size distribution itself. For example, in one or more embodiments, particles above 200 microns may be coated, and in some embodiments that may be the $d_{50}$ value and in other embodiments, it may be the $d_{75}$ value. In general, the resin material may be applied to the solid particulates by any technique known in the art. For example, an uncured resin material may be sprayed onto the solid particulates or the solid particulates may be dipped into or provided in a fluidized bed with an uncured resin in order to coat the particles. Moreover, the resin coating does not dramatically increase the size of the solid particulates as the coating provided by the resin material is thin.

In one or more embodiments, at least a portion of the surface area of each of the coated solid particulates is covered with the resin material. For example, at least about 10%, or at least about 25%, or at least about 50%, or at least about 75%, or at least about 90%, or at least about 95%, or at least about 99% of the surface area of the coated solid particulates is covered with the resin material. In one or more embodiments, about 40% to about 99.9%, about 85% to about 99.99%, or about 98% to about 100% of the surface area of the coated solid particulates is covered with the resin material In one or more embodiments, the entire surface area of the coated solid particulates is covered with the resin material. For example, the coated solid particulates can be encapsulated with the resin material.

The resin material is present on the solid particulates in any suitable amount. In one or more embodiments, the resin coated solid particulates contain at least about 0.1 wt % resin, at least about 0.5 wt % resin, at least about 1 wt % resin, at least about 2 wt % resin based on the total weight of the resin coated solid particulates. It should also be understood that the wt. % value may vary depending on the solid particulate material coated. For example, the wt % of resin would be smaller on a particulate of calcium carbonate than it would be on a similarly sized piece of nut shell due to differences in the density and/or surface area of each particulate material.

In one or more embodiments, the resin material may include any resin that can be controllably cured so that it may be only partially cured after its application to the solid particulates. For example, a resin may be cured by heating to elevated temperature and the curing process can be halted, resulting in a partially cured resin, upon decreasing the temperature after a pre-determined amount of time. Without being bound by theory it is believed that when the solid particulates are coated with a resin composition that is only partially cured prior to their introduction downhole, their concentration and/or consolidation within a loss zone combined with the high pressures and temperatures downhole can initiate further curing that may serve to fuse or bond the solid particulates into a more impermeable and resilient plug or seal of the loss zone. It is also envisioned that the curing may be triggered by separate pumping of a fluid containing an activator that triggers the curing of the resin. Such activators may include, for example, aromatic sulfonic acid such as toluenesulfonic acid, xylene sulfonic acid and mixtures thereof, or a glycol ether such as diethylene glycol monobutylether. The activator may be provided in an amount in the range of from about 0 to about 2 pounds of activator per 100 pounds of particulate. In one or more embodiments, the solid particulates may include at least two coatings of resin, with at least the outermost coating of resin being only partially cured. In these embodiments, the inner coating(s) of resin on a multi-coated solid particulate may be a completely or 100% percent cured resin coating. In one or more embodiments, a partially cured outermost coating of resin on the solid particulates may be from about 40 to 98% cured, or from about 50 to 95% cured, or from about 60 to 92.5% cured.

In one or more embodiments, the resin material can include a phenolic resin, such as a phenol-formaldehyde resin. According to one or more embodiments, the phenol-formaldehyde resin has a molar ratio of formaldehyde to phenol (F:P) from a low of about 0.6:1, or about 0.9:1, or about 1.2:1 to a high of about 1.9:1, or about 2.1:1, or about 2.3:1, or about 2.8:1. For example, the phenol-formaldehyde resin can have a molar ratio of formaldehyde to phenol of about 0.7:1 to about 2.7:1, about 0.8:1 to about 2.5:1, about 1:1 to about 2.4:1, about 1.1:1 to about 2.6:1, or about 1.3:1 to about 2:1.

For example, U.S. Pat. Nos. 3,929,191 and 8,273,406, which are herein incorporated by reference in their entirety, detail resin compositions that may be usable as coatings for the solid particulates.

In one or more embodiments, the resin coating applied to the solid particulates is an epoxy resin. According to such embodiments, the resin coating can include any suitable epoxy resin. For example, the epoxy resin can include bisphenol A, bisphenol F, aliphatic, or glycidylamine epoxy resins, and any mixtures or combinations thereof. Further, it is also envisioned that more than one resin system may be used, such as a first resin system being used as a cured undercoat, and a second system used as a curable or partially cured overcoat.

In one or more embodiments, the resin coated solid particulates may be added to a wellbore fluid prior to the wellbore fluid being pumped downhole. In some embodiments, the resin coated solid particulates may be present in the wellbore fluid used as a drilling fluid (i.e., circulated through the drill string and drill bit as the bit advances through the formation) so that when a loss occurs they are already present downhole to quickly seal and plug the loss zone. However, embodiments are also directed to the resin coated solid particulates being added on the fly or as a pill to a wellbore fluid being pumped downhole upon the detection of a fluid loss event. Further, a wellbore fluid with resin coated solid particulates dispersed therein may also be used as a squeeze treatment for a more targeted application of the resin coated solid particulates to a loss zone downhole. That is, the wellbore fluid containing the resin coated particulates may be pumped into the loss zone to slow the loss and then the pressure may be increased to pack the resin coated particulates into the fractures in the loss zone.

Further, it is also envisioned that the resin coated particulates of the present disclosure may be used in wellbore strengthening applications to prevent fluid loss. Specifically, it is envisioned that the resin coated particulates may be used to form a stress cage, such as described in U.S. Pat. No. 9,103,206, which is herein incorporated by reference in its entirety, in order to increase the fracture resistance of the formation. A fluid containing the resin coated particulates of the present disclosure may be pumped downhole and with increased pressure to initiate or re-open fractures in the formation. The fluid of the present disclosure may enter into the fractures and form bridges or plugs from the particulates, which is then allowed to cure, forming a consolidated mass of particles in the fractures.

In one or more embodiments, the resin coated solid particulates may be added in amounts that range from about 5 to 30 pounds per barrel (ppb), or from about 7.5 to 25 ppb, or from about 10 to 20 ppb.

In one or more embodiments, in addition to the resin coated solid particulates a lost circulation composition may also include at least one additive selected from un-coated solid particulates, fibrous materials, weighting agents, organophilic clays, emulsifiers and viscosifiers. Such components may depend, for example, on whether the resin coated particulates are present in the drilling fluid or are being used as a spot treatment.

In one or more embodiments, the resin coated solid particulates of the present disclosure may be used in oil-based wellbore fluids or aqueous-based wellbore fluids. Oil based fluids may include an invert emulsion (water in oil).

In one or more embodiments, the aqueous-based wellbore fluids may include at least one of fresh water, sea water, brine, mixtures of water and water-soluble organic compounds, and mixtures thereof. In various embodiments, the aqueous-based fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a synthetic brine include any one or more of those present in natural seawater or any other organic or inorganic dissolved salts. Additionally, brines that may be used in the drilling fluids disclosed herein may be natural or synthetic, with synthetic brines tending to be much simpler in constitution.

As mentioned above, in one or more embodiments, the wellbore fluid may be an invert emulsion. The oil-based/invert emulsion wellbore fluids may include an oleaginous continuous phase, a non-oleaginous discontinuous phase, and one or more additives. The oleaginous fluid may be a liquid and may be a natural or synthetic oil. For example, in one or more embodiments, the oleaginous fluid is selected from the group including diesel oil; mineral oil; paraffin oil; a synthetic oil, such as hydrogenated and unhydrogenated olefins including poly(alpha-olefins), linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms and may be less than about 99% by volume of the invert emulsion. In one or more embodiments, the amount of oleaginous fluid is from about 30% to about 95% by volume or from about 40% to about 90% by volume of the invert emulsion fluid. The oleaginous fluid, in one or more embodiments, may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and may be an aqueous liquid. In one embodiment, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus, in one embodiment, the amount of non-oleaginous fluid is less that about 70% by volume and or from about 1% to about 70% by volume. In another embodiment, the non-oleaginous fluid is from about 5% to about 60% by volume of the invert emulsion fluid.

In general, the resin coated solid particulates are free flowing, having no appreciable aggregation or agglomeration with each other, other wellbore fluid components, and/or equipment while dispersed in the wellbore fluid. However, when they enter a fluid loss zone they can become concentrated/aggregated due to particulate bridging combined with fluid leak off into the formation and they can become fused together as their partially uncured outermost resin coatings may be in contact and further cure under the pressure and temperature conditions present in the wellbore and/or loss zone. The seal/plug formed by the resin coated solid particulates may be a substantially impermeable barrier that effectively prevents wellbore fluid loss. For example, formation of a substantially impermeable barrier may be verified using surface equipment (such as a slot tester described in U.S. Patent Publication No. 2014/0182369), where particulates can be tested for their ability to seal/plug a "slot" (representative of a fracture) in a disc used to model a fracture/loss zone. In such a tester design (and using a volume of 350 mL) the resin coated solid particulates may be capable of forming a seal/plug that can hold the seal (after allowing for initial spurt fluid loss while forming the seal) against a pressure of at least 250 psi, or at least 500 psi. Further, in the slot test indicated above, the resin coated solid particulates may be capable of forming a seal/plug that can hold a pressure that is up to 25% higher, or up to 35% higher, or up to 45% higher than a seal/plug formed by the same solid particulates that are not coated with a resin. In the slot test indicated above, the resin coated solid particulates may be capable of forming a seal/plug that allows up to 25% less fluid loss, or up to 35% less fluid loss, or up to 45% less fluid loss before complete failure of the seal/plug.

Significantly, the LCM composition indicated above may allow operators to safely drill further into a formation prior to casing a drilled interval because the resin coated solid particulates may be capable of sealing/plugging loss zones under higher pressures than conventional lost circulation materials. Specifically, operators commonly have to stop drilling to case an initially drilled wellbore interval before drilling further in order to protect the formation from the increase in mud weight that is needed to balance the formation pressure as deeper portions of the wellbore are drilled. As indicated above, the resin coated solid particulates are believed to aggregate and further cure once concentrated in the weaker and more permeable fluid loss zones, thereby forming a seal/plug from the interconnected mass of solid particulates. The strength and stability of the plug/seal formed from resin coated solid particulates may be able to withstand heavier mud weights as the majority of the entire cured mass would need to be displaced from the loss zone for failure of the seal to occur, as compared to weaker conventional seals/plugs that are formed of discrete particles only held together primarily by friction.

In addition to the increased ability to form and hold a substantially impermeable seal in a loss zone, there are other benefits to using resin coated solid particulates as a LCM.

For example, the resin coating may improve the attrition rate of the LCM because the resin coating makes the LCM more resistant to the grinding and other forces experienced during wellbore operations. Further, the resin coating may help a LCM material that absorbs/adsorbs fluid more mechanically strong than an uncoated LCM which may lose its mechanical strength over time with exposure to wellbore fluids. In the case of more angular LCM materials (e.g., crushed shells and the like), a resin coating can smooth out the surface of the LCM, thereby rendering it less abrasive to the wellbore equipment it encounters during wellbore operations.

EXAMPLES

Example 1—Slot Test

In this example, resin coated crushed pecan shells were compared to un-coated crushed pecan shells in their ability to form a plug/seal in a 1500 micron slot. The crushed pecan shells are available as NUT PLUG from M-I L.L.C., Houston, Tex. The resin coated pecan shells were coated with a phenol-formaldehyde resin having an initial layer that is cured completely and a second, outer layer, 90% cured. The crushed pecan shells were dispersed in RHELIANT PLUS drilling fluid, available from M-I L.L.C, Houston, Tex. Each of the sample fluids also contained 10 pounds per barrel (ppb) G-Seal Plus, which is a plugging agent available from M-I L.L.C, Houston, Tex.

The results shown in FIG. 1 indicate that the lost circulation composition that includes the resin coated solid particulates forms a plug/seal that experiences less volume loss at comparable pressures to the lost circulation composition that includes only un-coated solid particulates. Further, the plug/seal formed by the lost circulation composition that includes the resin coated solid particulates does not experience failure up to at least 4000 psi, while the plug/seal formed without the resin coated solid particulates failed at a pressure of 2750 psi (e.g., see the dramatic increase in fluid loss at 2750 psi).

Figure 2:
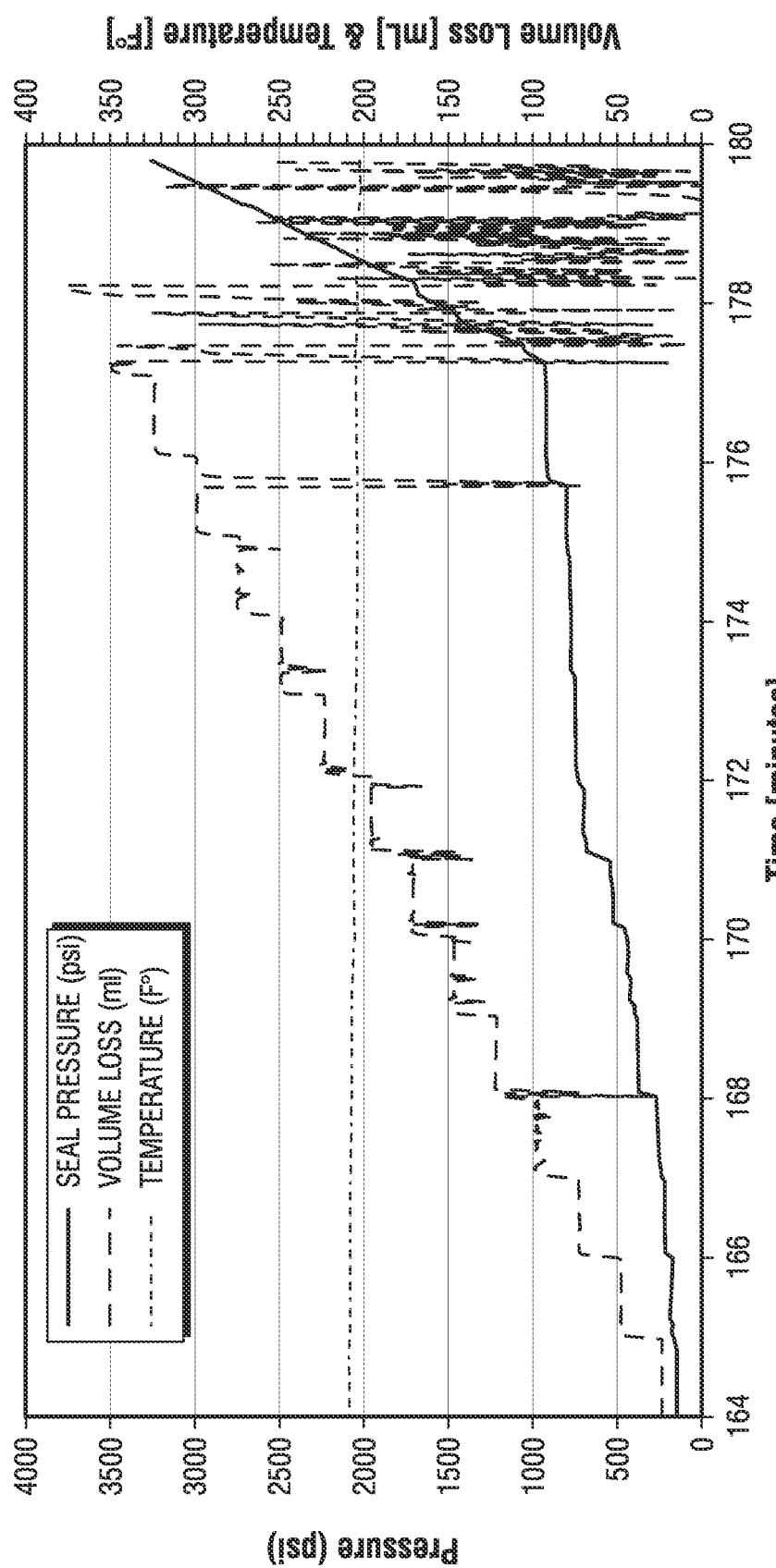
FIG. 2 shows a plot of the results obtained from a slot test described in Example 1.
Figure 3:
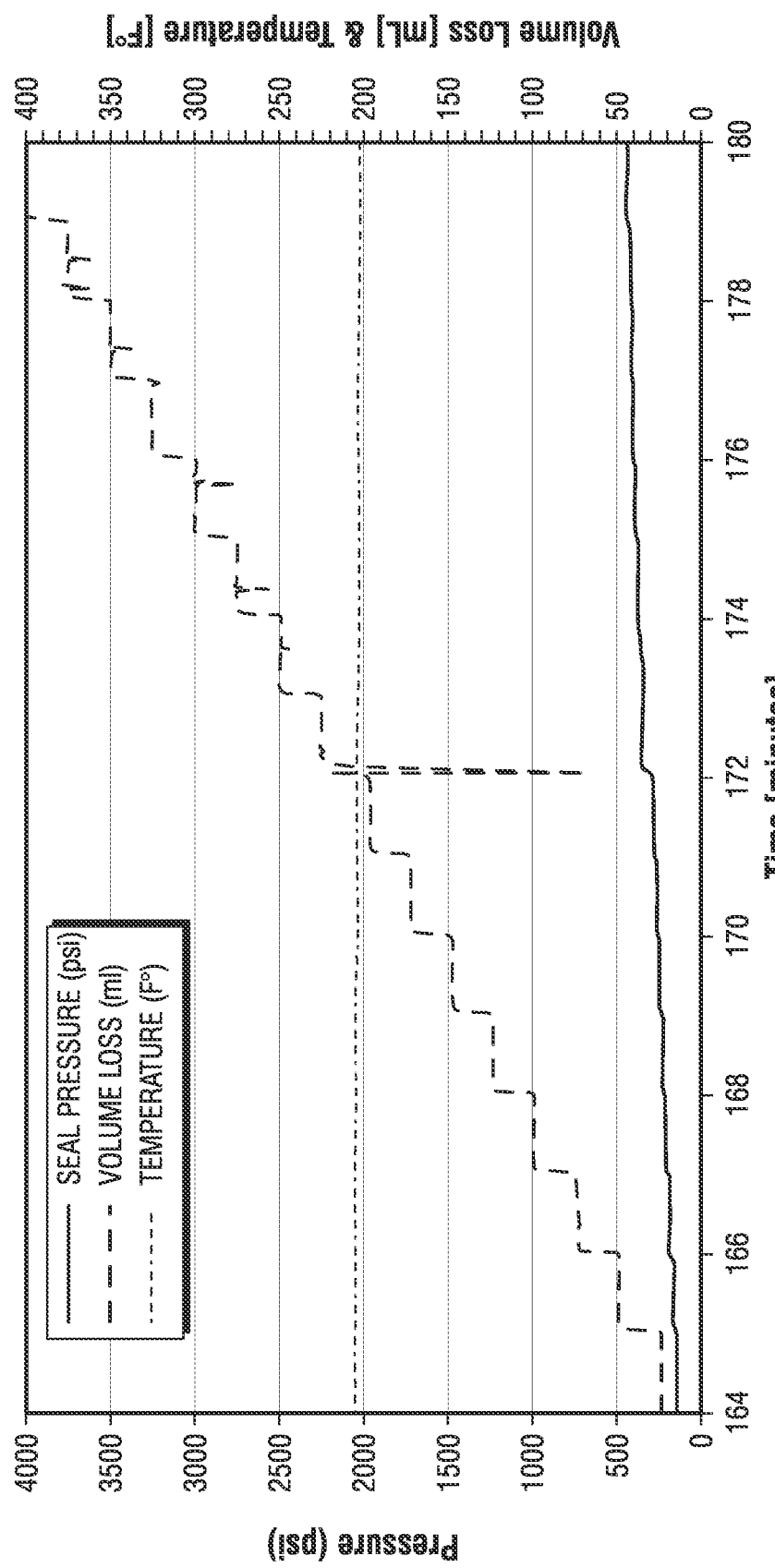
FIG. 3 shows a plot of the results obtained from a slot test described in Example 1.

FIGS. 2 and 3 show the results for similar tests done using a LCM composition that includes crushed shells of two different grades or size distributions dispersed in RHELIANT PLUS drilling fluid, available from M-I L.L.C, Houston, Tex. FIG. 2 shows the results for the test done using uncoated crushed shells of NUT PLUG fine grade (10 ppb) and NUT PLUG medium grade (12.5 ppb). FIG. 3 shows the results for the test done using resin coated crushed shells of NUT PLUG fine grade (10 ppb) and NUT PLUG medium grade (12.5 ppb). Both samples also contained 10 ppb G-Seal Plus as another additive. From the results it can be seen that the sample shown in FIG. 3 (containing the resin coated crushed shells) can form a plug/seal that does not experience failure, and exhibits minimal fluid loss, up to at least 4000 psi, while the plug/seal formed with the uncoated crushed shells failed at pressure of about 3250 psi (e.g., see the dramatic increase in fluid loss at about 3250 psi).

Example 2—Accretion Test

In these accretion tests, lost circulation compositions containing resin coated solid particulates were compared with lost circulation compositions that contained only un-coated solid particulates in their respective accretion (i.e., accumulation) on solid metal bars. The tests were performed by sealing the metal bars in a vessel including the lost circulation compositions and hot rolling for three hours at 250° F. The percent accretion is determined by comparing the mass of the metal bars before and after the test without cleaning the bar after the test. The fluid used was approximately 350 mL of RHELIANT PLUS, a non-aqueous drilling mud available from M-I L.L.C, Houston, Tex.

The lost circulation compositions used in the solid bar accretion test included 5 grams of G-Seal Plus and 10 grams of either a coated or an uncoated NUT PLUG material of fine grade, and 15 grams of either a coated or an uncoated NUT PLUG material of medium grade, available from M-I, L.L.C., Houston, Tex., The results shown below in Table 1 are for the fluids in the hollow bar accretion test.

TABLE 1

| Sample | Time (min) | % Material Accretion | Average % Accretion |
| --- | --- | --- | --- |
| Uncoated #1 | 180 | 0.02 | 0.08 |
| Uncoated #2 | 180 | 0.13 | |
| Coated #1 | 180 | 0.33 | 0.30 |
| Coated #2 | 180 | 0.27 | |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of reducing fluid loss, comprising:
   pumping a wellbore fluid including resin coated solid particulate into a wellbore having fractures therein, the resin coated solid particulate forming a plug in the fractures,
   wherein
   the resin coated solid particulate is added to the wellbore fluid in an amount from 5 to 30 pounds per barrel,
   the resin coated solid particulate has a d50 size ranging from about 10 to 5000 microns, and
   solid particulate material of the resin coated solid particulate is selected from naturally occurring materials consisting of ground or crushed shells of one or more nuts, ground or crushed seed shells of seeds of one or more fruits, ground or crushed material of maize, corn cobs or corn kernels, and processed wood materials derived from one or more woods.

2. The method of claim 1, wherein the wellbore fluid is an aqueous-based fluid or an oil-based wellbore fluid.

3. The method of claim 1, wherein the resin coated solid particulate may be added to the wellbore fluid in an amount from 7.5 to 25 pounds per barrel.

4. The method of claim 1, wherein a particle size distribution of the resin coated solid particulate comprises a largest particle of particulates is no less than about two times larger than a smallest particle.

5. The method of claim 1, wherein the resin coated solid particulate is blended with an uncoated solid particulate material.

6. The method of claim 5, wherein an amount of resin coated solid particulate in the wellbore fluid is at least about 50% by weight of total solid particulates added.

7. A method of reducing fluid loss, comprising:
   pumping a wellbore fluid including resin coated solid particulate into a wellbore having fractures therein, the resin coated solid particulate forming a plug in the fractures,
   wherein the resin coated solid particulate is added to the wellbore fluid in an amount from 5 to 30 pounds per barrel, the resin coated solid particulate has a d50 size ranging from about 10 to 5000 microns, and the resin coated solid particulate that is larger than the d50 of a total amount of solid particulates is coated with resin, while the remaining solid particulates are uncoated.

8. The method of claim 1, wherein an outermost coating on the resin coated solid particulate is from about 40 to 98% cured.

9. The method of claim 1, wherein the resin coated on the resin coated solid particulate is a phenol-formaldehyde resin or an epoxy resin.

10. The method of claim 1, wherein pressure of the pumping initiates and/or re-opens the fractures in a formation.

11. A method comprising:

drilling a wellbore through a formation using a first wellbore fluid; and pumping, upon experiencing a fluid loss event to the formation, a second wellbore fluid including resin coated solid particulates into the wellbore, wherein the resin coated solid particulates are added to the second wellbore fluid in an amount from 5 to 30 pounds per barrel, the resin coated solid particulate has a d50 size ranging from about 10 to 5000 microns, and solid particulate material of the resin coated solid particulate is selected from naturally occurring materials consisting of ground or crushed shells of one or more nuts, ground or crushed seed shells of seeds of one or more fruits, ground or crushed material of maize, corn cobs or corn kernels, and processed wood materials derived from one or more woods.

12. The method of claim 11, wherein the resin coated solid particulates are added to the second wellbore fluid in an amount from 7.5 to 25 pounds per barrel.

13. The method of claim 11, wherein a particle size distribution of the resin coated solid particulates comprises a largest particle of solid particulates is no less than about two times larger than a smallest particle.

14. The method of claim 11, wherein the resin coated solid particulates are blended with an uncoated solid particulate material.

15. The method of claim 11, wherein an outermost coating on the resin coated solid particulates is from about 40 to 98% cured.

16. The method of claim 11, wherein the resin coated on the resin coated solid particulates is a phenol-formaldehyde resin or an epoxy resin.

* * * * *